UNITED STATES PATENT OFFICE.

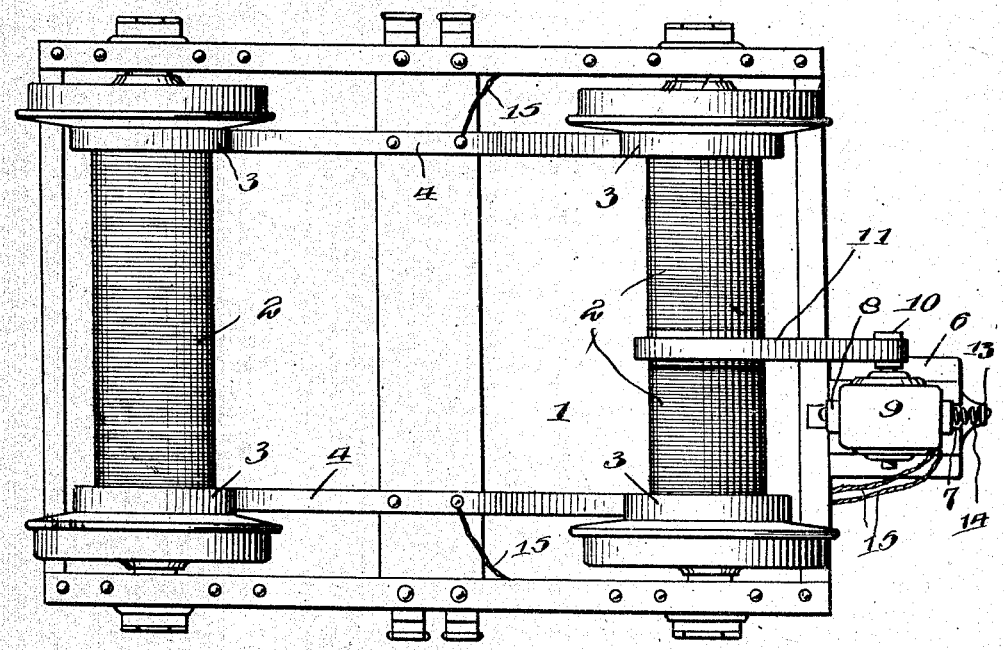
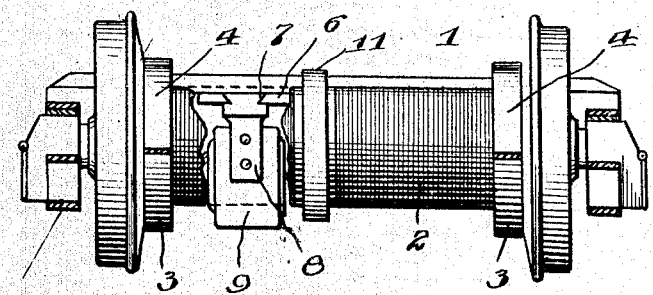

WILLIAM F. GRAY, OF MERIDIAN, MISSISSIPPI.

RAILWAY SAFETY DEVICE.

1,174,854.   Specification of Letters Patent.   Patented Mar. 7, 1916.

Application filed September 8, 1915. Serial No. 49,563.

*To all whom it may concern:*

Be it known that I, WILLIAM F. GRAY, a citizen of the United States, residing at Meridian, in the county of Lauderdale and State of Mississippi, have invented new and useful Improvements in Railway Safety Devices, of which the following is a specification.

This invention relates to improvements in railway safety appliances and has particular application to an electromagnetic device for causing the car wheels to adhere to the rails.

In carrying out the present invention, it is my purpose to provide an electromagnetic device whereby the wheels of the cars will be magnetized to adhere to the rails of the trackway, thereby preventing the trucks of the cars from jumping the track and eliminating the possibility of the cars leaving the rails.

It is also my purpose to provide means of the class described whereby the magnetic lines of force will be increased in direct proportion to the speed of the car and which may be installed and maintained at comparatively small cost.

With the above and other objects in view, the invention consists in the construction, combination and arrangement of parts hereinafter set forth in and falling within the scope of the claim.

Figure 3:
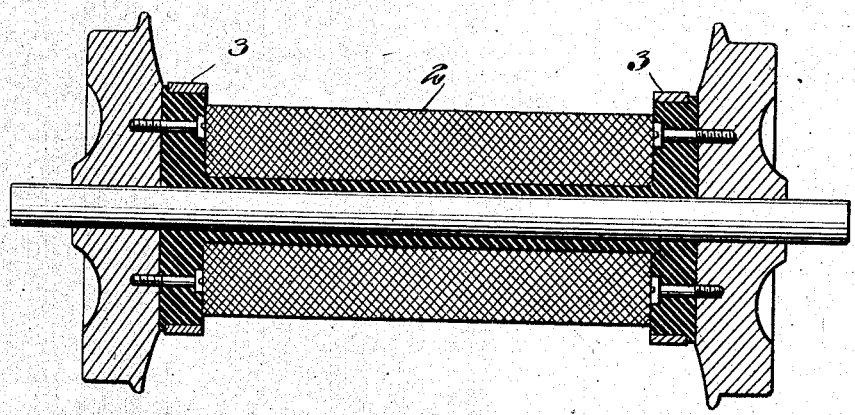
Figure 4:
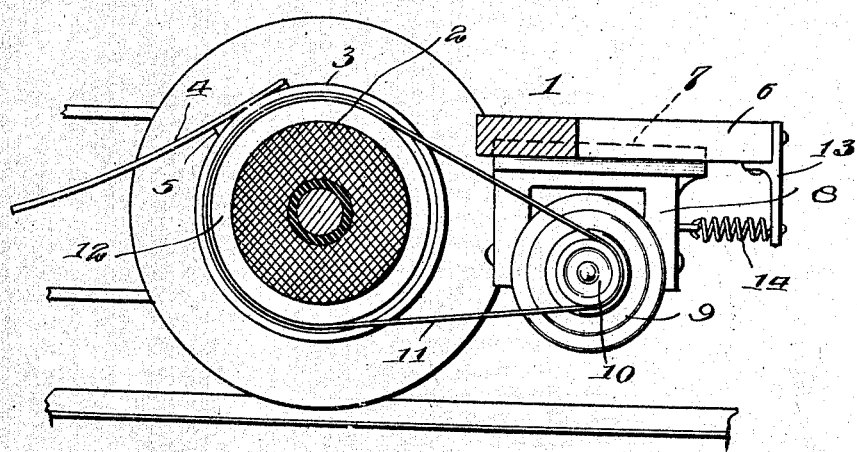

In the accompanying drawings; Figure 1 is a bottom plan view of a car truck equipped with means constructed in accordance with the present invention. Fig. 2 is a cross sectional view through the truck. Fig. 3 is an enlarged longitudinal sectional view through one of the axles of the truck. Fig. 4 is an enlarged fragmentary longitudinal sectional view through one end of the truck showing the axle in cross section and the driving connections between the generator and the axle.

Referring now to the drawings in detail, 1 designates a car truck of any approved type.

In accordance with my present invention, each axle of the truck 1 is equipped with a magnetizing winding 2 surrounding the axle and extending from one wheel to the other, while secured to the inner faces of the wheels, respectively, on each axle and insulated from such wheels are current collecting rings 3 to which the terminals of the winding are secured. Fastened to the lower surface of the center bolster of the truck and extending longitudinally of the truck are spring arms 4 spaced apart in parallelism and having the outer ends thereof equipped with brushes 5 bearing against the current collecting rings 3, respectively. Connected to one end sill of the truck and projecting outwardly therefrom is a supporting block 6 having the lower surface thereof formed with a groove 7 dovetailed in cross section and slidably mounted within the groove 7 is a saddle 8 having the portion thereof within the groove of a cross sectional configuration corresponding to that of the groove. Fixed within the saddle 8 is a dynamo 9 having the armature shaft equipped with a belt pulley 10 connected by means of a belt 11 with a belt wheel 12 surrounding the adjacent axle and fixed thereto. Secured to the outer end of the block 6 and projecting outwardly therefrom is an arm 13 and connecting the outer extremity of the arm 13 with the saddle 8 is a retractile spring 14 acting to pull the saddle and dynamo away from the axle so that the belt will be maintained tight. The terminals of the dynamo are connected with the respective spring arms 4 by means of leads 15, the arms being insulated from the truck to prevent short circuiting.

In practice, as the car travels over the trackway, the revolving axle carrying the belt wheel 12 drives the belt pulley 10, thereby rotating the armature of the dynamo and in the operation of the dynamo current is delivered to the spring arms through the brushes and the collecting rings to the magnetizing winding on the respective axles of the truck. Upon the energization of the windings the wheels are magnetized and, being magnetized, adhere to the rails of the trackway, thereby preventing the truck from leaving the track.

The spring 14 acting upon the saddle carrying the generator holds the driving belt of the generator taut so as to insure the proper operation of the generator or dynamo.

It will be seen that the greater the speed of the train, the more current the dynamo will develop, thereby increasing the action of the wheels on the rails.

It will be noted that when employing my invention, it will not be necessary to sand the rails, and sliding of the wheels will be prevented.

I claim:

The combination with a car truck, of a block secured to one end of the truck and projecting outwardly therefrom and having the lower face thereof formed with a guideway, a saddle slidably mounted within said way, a dynamo carried by said saddle, a belt and pulley driving connection between the dynamo and the adjacent axle of the car truck, and a spring connected to the outer end of said saddle and acting to draw the dynamo normally away from the axle to hold the belt taut.

In testimony whereof I affix my signature in presence of two witnesses.

WILLIAM F. GRAY.

Witnesses:
H. C. SMITH,
J. A. GULLEY.